United States Patent [19]
Baker

[11] Patent Number: 5,198,619
[45] Date of Patent: Mar. 30, 1993

[54] TERMINATION OF MINERAL INSULATED ELECTRIC CABLE

[75] Inventor: Harry Baker, Knutsford, England

[73] Assignee: BICC Public Limited Co., England

[21] Appl. No.: 757,226

[22] Filed: Sep. 10, 1991

[30] Foreign Application Priority Data

Sep. 20, 1990 [GB] United Kingdom ................ 9020556
Apr. 9, 1991 [GB] United Kingdom ................ 9107454

[51] Int. Cl.⁵ .......................................... H02G 15/02
[52] U.S. Cl. .................................. 174/74 A; 174/76; 174/92
[58] Field of Search ............... 174/74 A, 74 R, 92, 174/76, 87, 88 R, 93

[56] References Cited

U.S. PATENT DOCUMENTS

| | | | |
|---|---|---|---|
| 3,144,506 | 8/1964 | Gunthel, Jr. | 174/92 |
| 3,715,459 | 2/1973 | Hoffman | 174/92 X |
| 4,392,014 | 7/1983 | Trumble et al. | 174/92 |
| 4,451,696 | 5/1984 | Beinhaur | 174/92 |
| 4,849,580 | 7/1989 | Reuter | 174/92 |

FOREIGN PATENT DOCUMENTS

| | | | |
|---|---|---|---|
| 1948877 | 4/1971 | Fed. Rep. of Germany | 174/76 |
| 980547 | 1/1965 | United Kingdom | 174/76 |
| 2225496 | 5/1990 | United Kingdom | 174/76 |

Primary Examiner—Morris H. Nimmo
Attorney, Agent, or Firm—Anthony J. Casella; Gerald E. Hespos

[57] ABSTRACT

A simple and inexpensive mineral insulated cable termination comprises a flexible plastics tube which at one end fits over the cut-back sheath of the cable and which at the other end is closed by an end wall spaced from the surface of the cable, each cable conductor passing through one of a plurality of throughbores in the end wall and, filling the space within the tube, waterproof electrically insulating compound. At a first position around the circumferential wall of the tube, the wall is slit throughout its length and radial thickness and at one position or at each of two positions circumferentially spaced from said first position the wall is adapted to constitute a hinge extending throughout the length of the wall. The abutting longitudinally extending parts of the wall at said first position are so shaped one effects a snap-fit with the other throughout the length of the tube.

15 Claims, 6 Drawing Sheets

TERMINATION OF MINERAL INSULATED ELECTRIC CABLE

This invention relates to the termination of mineral insulated electric cables, that is to say cables of the kind comprising at least one conductor insulated from a surrounding metal sheath, and where there is more than one conductor from the other conductor or conductors, by compacted mineral insulating powder, usually but not necessarily magnesium oxide.

Compacted mineral insulating powder is particularly vulnerable to water penetration and it is the general practice to protect an end of a mineral insulated cable against the ingress of moisture by a metal sealing pot which is screwed or otherwise secured to the cable sheath and which is filled with waterproof sealing compound. Assembly of a sealing pot on an end of a mineral insulated electric cable in such a way as to provide an effective waterproof termination requires a degree of skill and the time taken to terminate mineral insulated electric cables of a mineral insulated electric cable installation contributes to a substantial proportion of the overall cost of the installation.

It is an object of the present invention to provide a mineral insulated electric cable having an end terminated by an improved sealing pot which is simple and inexpensive and readily secured to the end of the cable by semi-skilled or unskilled personnel.

According to the invention, an improved mineral insulated electric cable termination comprises a tube of flexible electrically insulating material which at one end of the tube fits over the cut-back metal sheath of the cable and which at the other end of the tube is closed by an end wall spaced from the end face of the cable, the or each cable conductor passing through a throughbore or one of a plurality of throughbores in the end wall and, filling the space within the tube between the end face of the cable and said end wall, waterproof electrically insulating which seals the compacted mineral insulating powder exposed at said end face of the cable compound, wherein at a first position around the circumferential wall of the tube the wall is slit throughout its length and radial thickness and at at least one position circumferentially spaced from said first position the wall is adapted to constitute a hinge extending throughout the length of the wall the abutting longitudinally extending parts of the wall at said first position being so shaped that one effects a snap fit with the other throughout the length of the tube.

When assembling the improved mineral insulated electric cable termination on an end of the cable, the tube is presented to the cut-back end of the cable in its open state; before or after the or each cable conductor is or has been threaded through the throughbore or throughbores in the end wall of the tube, at least one of the hinged parts of the tube is substantially filled with waterproof electrically insulating compound; and the parts of the tube are then applied to the cut-back end of the cable and snapped together so that the space within the tube between the cut-back end of the cable and the end wall of the tube is substantially filled with waterproof electrically insulating compound, any excess compound being squeezed out of the tube between the or each conductor and the surrounding boundary wall of the throughbore through which it passes.

The abutting longitudinally extending parts of the circumferential wall at said first position may be of any complementary shapes that will effect a snap fit with one another throughout the length of the tube but, preferably, one of said two abutting parts has extending longitudinally throughout its length an outwardly extending protuberance which effects a snap fit in a groove of complementary cross-sectional shape extending longitudinally throughout the length of the inner surface of the other part.

Preferably, the circumferential wall of the tube at the or each position circumferentially spaced from said first position is of such a transverse cross-sectional shape and/or of such a radial thickness that the wall at this position effectively constitutes a hinge.

Where the mineral insulated electric cable has one conductor or two conductors, preferably the circumferential wall of the tube is adapted to constitute a hinge extending throughout the length of the wall at a second position substantially diametrically opposite said first position and, in this case, the end wall of the tube may be integral with one of the two hinged parts of the tube or it may be slit substantially diametrically from said first position to said second position so that the end wall is divided into two parts and that each part of the end wall is integral with one of the two hinged parts of the tube.

Where the mineral insulated electric cable has three conductors, preferably the end wall of the tube is slit transversely over a part of its width extending from said first position along its diameter and over the majority of the remainder of its width along two substantially parallel planes on opposite sides of the axis of the end wall dividing the end wall into a central portion and two other portions, the diametrically extending slit containing the axis of one throughbore and each of said two parallel slits containing the axis of one of the other two throughbores, and the circumferential wall of the tube at two circumferentially spaced positions extending from the closed ends of the two parallel slits in the end wall and throughout the length of the circumferential wall is adapted to constitute two circumferentially spaced hinges.

Where the mineral insulated electric cable has two or four conductors, preferably the end wall of the tube is slit transversely over the majority of its width along two substantially parallel planes on opposite sides of the axis of the end wall dividing the end wall into a central portion and two other portions, one of said two parallel slits containing the axis of a first throughbore or the axes of two throughbores in said end wall and the other of said two parallel slits containing the axis of the second throughbore or the axes of third and fourth throughbores in said end wall, and the circumferential wall of the tube at two circumferentially spaced positions extending from the closed ends of the slits in the end wall and throughout the length of the circumferential wall is adapted to constitute two circumferentially spaced hinges.

Instead of being integral with one or each of the parts of the tube, the end wall may consist of a separately formed button of ceramic or vitreous insulating material secured within the tube at or near said other end. In a preferred embodiment, the tube is closed at said other end by an end wall integral with at least one of the hinged parts of the tube and by a button of ceramic or vitreous insulating material secured within the tube at or near said closed end, the or each conductor of the cable passing through axially aligned throughbores in the button and said end wall.

An embodiment in which said other end of the tube is closed by an end wall integral with at least one of the hinged parts of the tube and/or by a separately formed button has the important advantage that, after the or each cable conductor has been passed through the throughbore or throughbores in the end wall and/or button and insulating compound has been disposed in one or each part of the tube, as the hinged parts of the tube are closed the mineral insulated cable can be urged axially towards said other end of the tube thereby acting as a piston compressing the insulating compound within the space bounded by the tube and out of the tube between the or each conductor and the surrounding boundary wall of the throughbore through which it passes.

The end wall of the tube, both when it is integral with at least one of the hinged parts of the tube and when it is a separately formed button of ceramic or vitreous insulating material, preferably has extending lengthwise and outwardly from the end wall a sleeve or two or more sleeves in substantially axial alignment with the throughbore or throughbores in the end wall and surrounding the cable conductor or conductors. Where the end wall has one throughbore or two throughbores and is slit substantially diametrically from said first position to said second position, the axis of the or each throughbore may lie on said diametrically extending slit and the or each sleeve may be slit transversely throughout its length so that one part of the sleeve is integral with one portion of the end wall and the other part of the sleeve is integral with the other portion of the end wall. Where the end wall has two, three or four throughbores and is slit transversely over the majority of its width along two parallel planes on opposite sides of the axis of the end wall, each of the sleeves may be slit transversely throughout its length so that one part of the sleeve is integral with the central portion of the end wall and the other part of the sleeve is integral with one of the other portions of the end wall.

Where a button of ceramic or vitreous material is secured within the tube at or near said other end, preferably the button has means positively preventing movement of the button with respect to the tube in a direction away from the said other end of the tube. The internal surface of the wall of the tube near said other end may have a peripherally continuous groove in which the button fits and within which it may be permanently secured by an appropriate cement. Over at least a part of the length of the or each throughbore of the button remote from said other end of the tube, preferably the internal diameter of the throughbore increases smoothly in a direction towards the end face of the cable to form, in effect, a throat into which a conductor can be readily guided.

Preferably, the circumferential wall of that part of the length of the tube which fits over the cut-back metal sheath of the cable has in and protruding inwardly from the circumferential wall a device of metal or metal alloy whose protruding part so mechanically engages with and secures the tube to the cable metal sheath as to restrain the tube against removal from the cable. In a preferred embodiment, the metal retaining device is a clip which has a protruding part of substantially C-shape between the limbs of which the cable metal sheath is a force fit. The radially inner edge of the C-shaped clip may have one or more than one inwardly extending tooth of such a shape that it bites into the cable sheath and serves to restrain the tube against rotational movement on and with respect to the cable.

The invention also includes, for use in the assembly of an improved mineral insulated electric cable termination as hereinbefore described, an improved mineral insulated cable terminating device comprising a tube of flexible electrically insulating material which is of substantially circular internal and external transverse cross-section and which is open at one end and closed at or near its other end by an end wall extending substantially radially with respect to the longitudinal axis of the tube and having therein at least one throughbore, wherein at a first position around the circumferential wall of the tube the wall is slit throughout its length and radial thickness and at at least one position circumferentially spaced from said first position the wall is adapted to constitute a hinge extending throughout the length of the wall, the longitudinally extending parts of the wall at said first position being so shaped that one is adapted to effect a snap fit with the other throughout the length of the tube.

Where a mineral insulated electric cable with which the improved mineral insulated cable terminating device is to be used has one conductor or two conductors, preferably the circumferential wall of the tube is adapted to constitute a hinge extending throughout the length of the wall at a second position substantially diametrically opposite said first position and the end wall is slit substantially diametrically from said first position to said second position so that each part of the end wall is integral with one of the two parts of the tube. Where a mineral insulated electric cable with which the improved mineral insulated cable terminating device is to be used has three conductors, preferably the end wall of the tube is slit transversely over a part of its width extending from said first position along its diameter and over the majority of the remainder of its width along two substantially parallel planes on opposite sides of the axis of the end wall dividing the end wall into a central portion and two other portions, the diametrically extending slit containing the axis of one throughbore and each of said two parallel slits containing the axis of one of the other two throughbores. Where a mineral insulated electric cable with which the improved mineral insulated cable terminating device is to be used has two or four conductors, preferably the end wall of the tube is slit transversely over the majority of its width along two parallel planes on opposite sides of the axis of the end wall, one of said two parallel slits containing the axis of a first throughbore or the axes of two throughbores in said end wall and the other of said two parallel slits containing the axis of the second or the axes of third and fourth throughbores in said end wall. In each of the latter two cases the circumferential wall of the tube at two circumferentially spaced positions extending from the closed ends of the slits in the end wall and throughout the length of the circumferential wall is adapted to constitute two circumferentially spaced hinges.

At least one of the parts of the tube may be pre-filled with waterproof electrically insulating compound of a grease-like nature.

The invention is further illustrated by a description, by way of example, of two preferred mineral insulated electric cable terminations with reference to the accompanying drawings, in which:

FIG. 1 is a plan view of the mineral insulated cable terminating device used in the first preferred mineral insulated electric cable termination, drawn on a greatly enlarged scale;

FIGS. 2 and 3, respectively, are end views of the terminating device shown in FIG. 1 in the directions of Arrows II and III;

Figure 6:
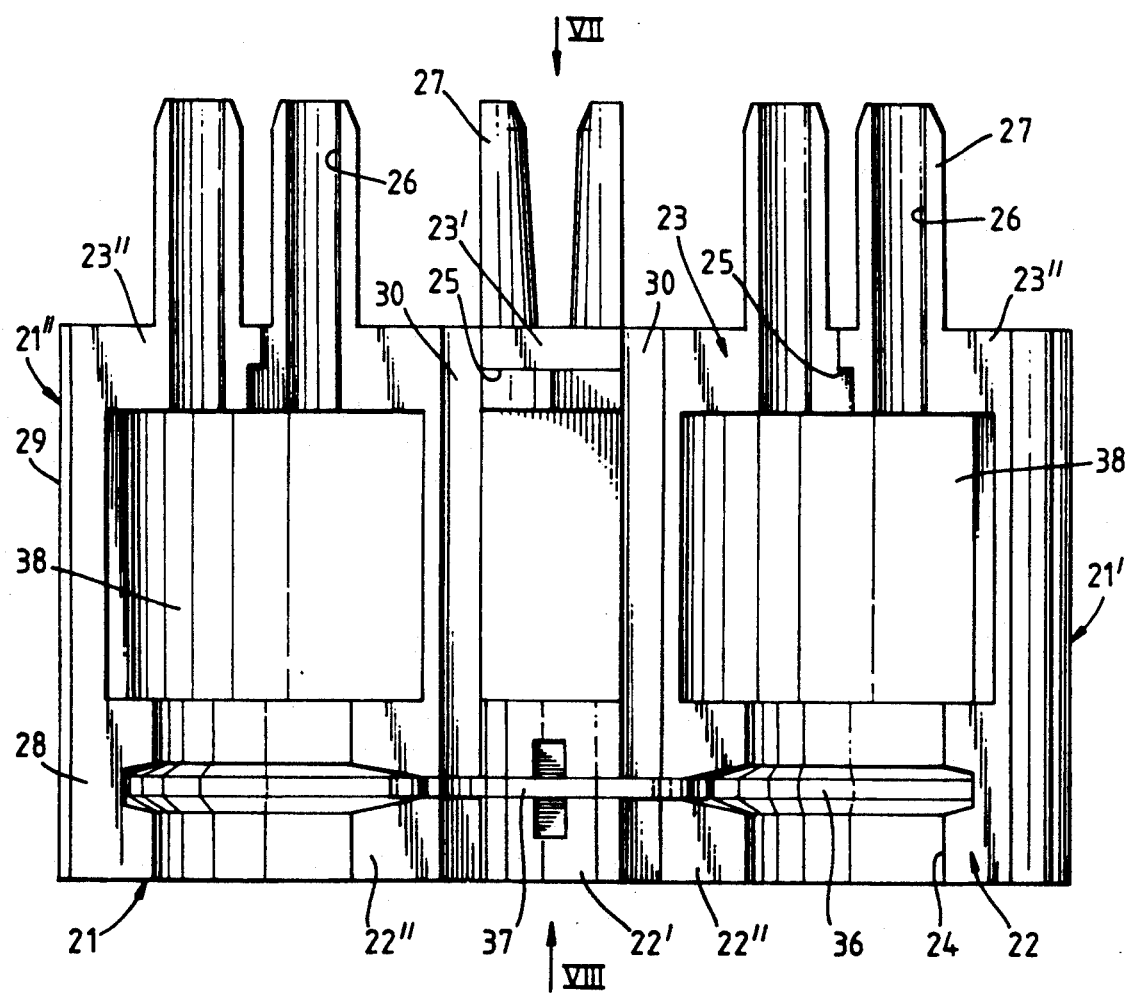
FIG. 6 is a plan view of the mineral insulated cable terminating device used in the second preferred mineral insulated cable termination, drawn on a greatly enlarged scale.
Figure 7:
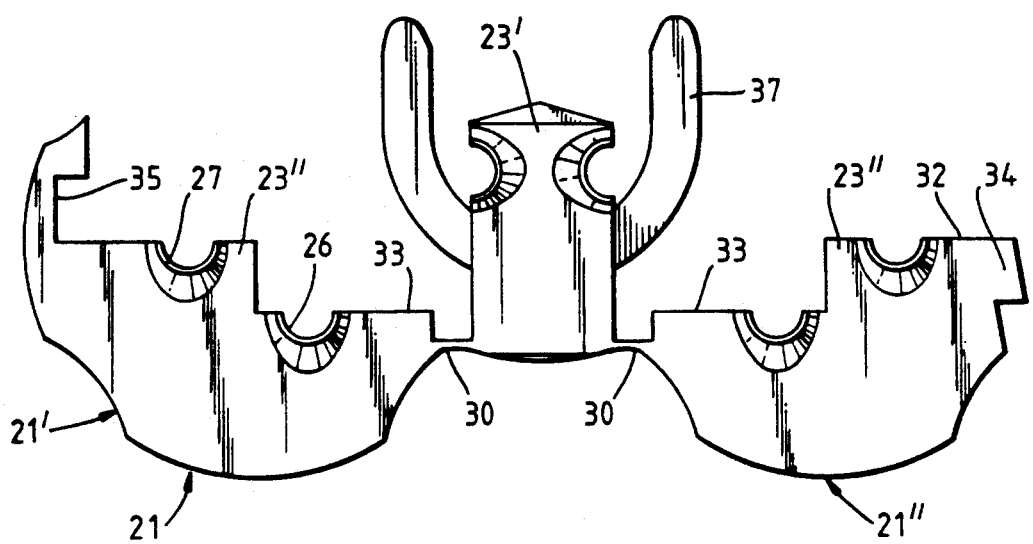
Figure 8:
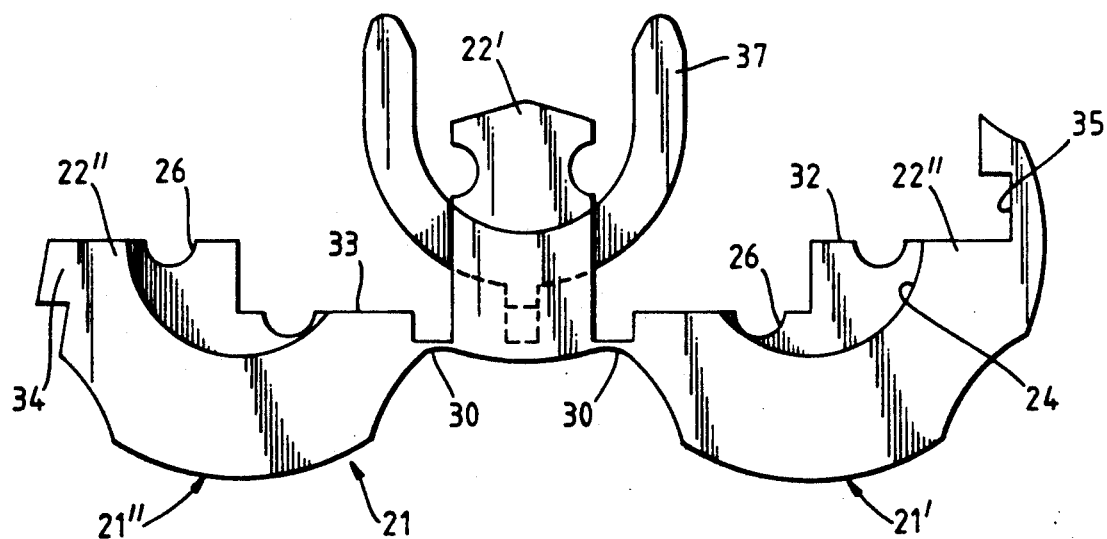
Figure 9:
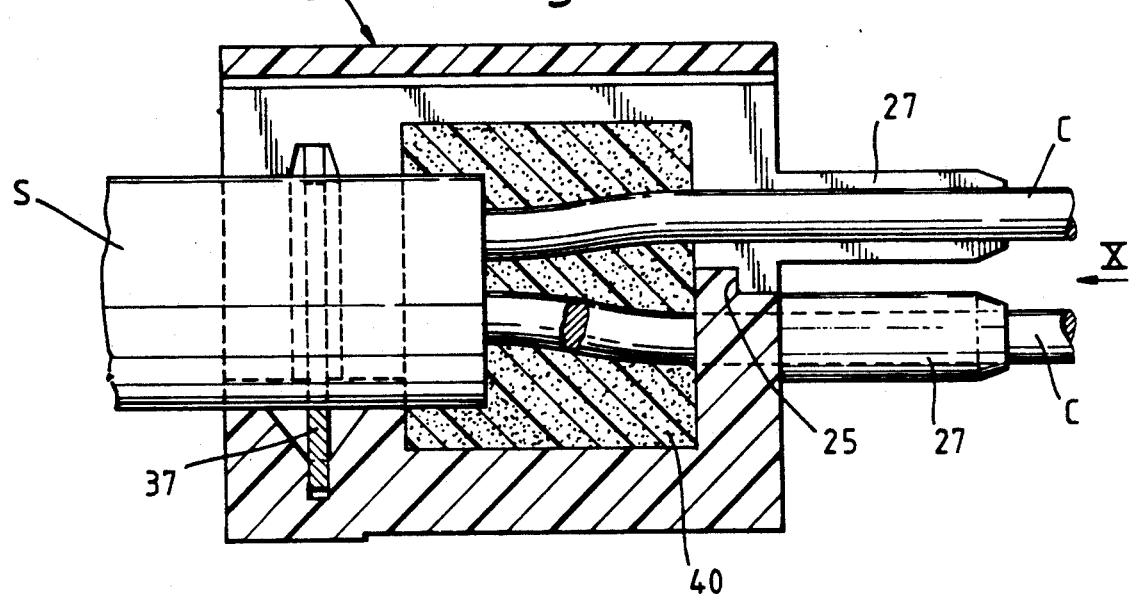
Figure 10:
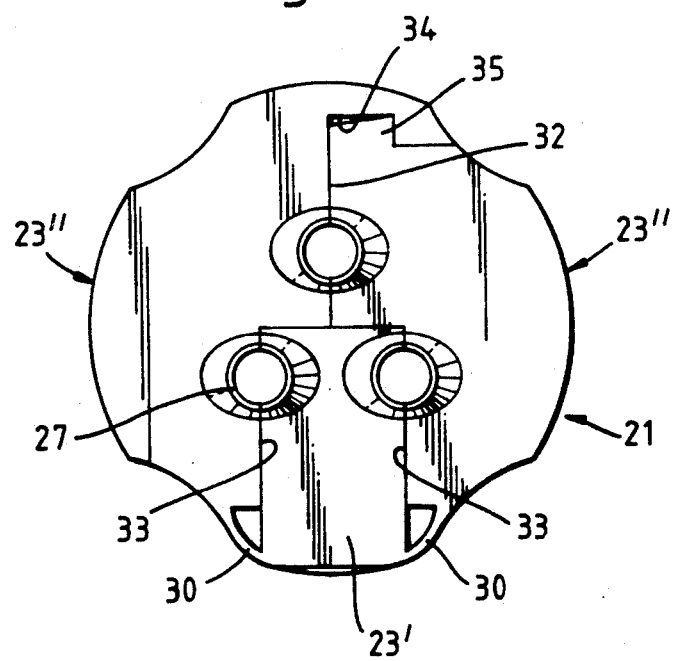

FIGS. 7 and 8, respectively, are end views of the terminating device shown in FIG. 6 in the directions of Arrows VII and VIII;

FIG. 9 is a sectional side view of the second preferred mineral insulated electric cable termination, drawn on a greatly enlarged scale, and FIG. 10 is an end view of the termination shown in FIG. 9 in the direction of Arrow X.

Figure 1:
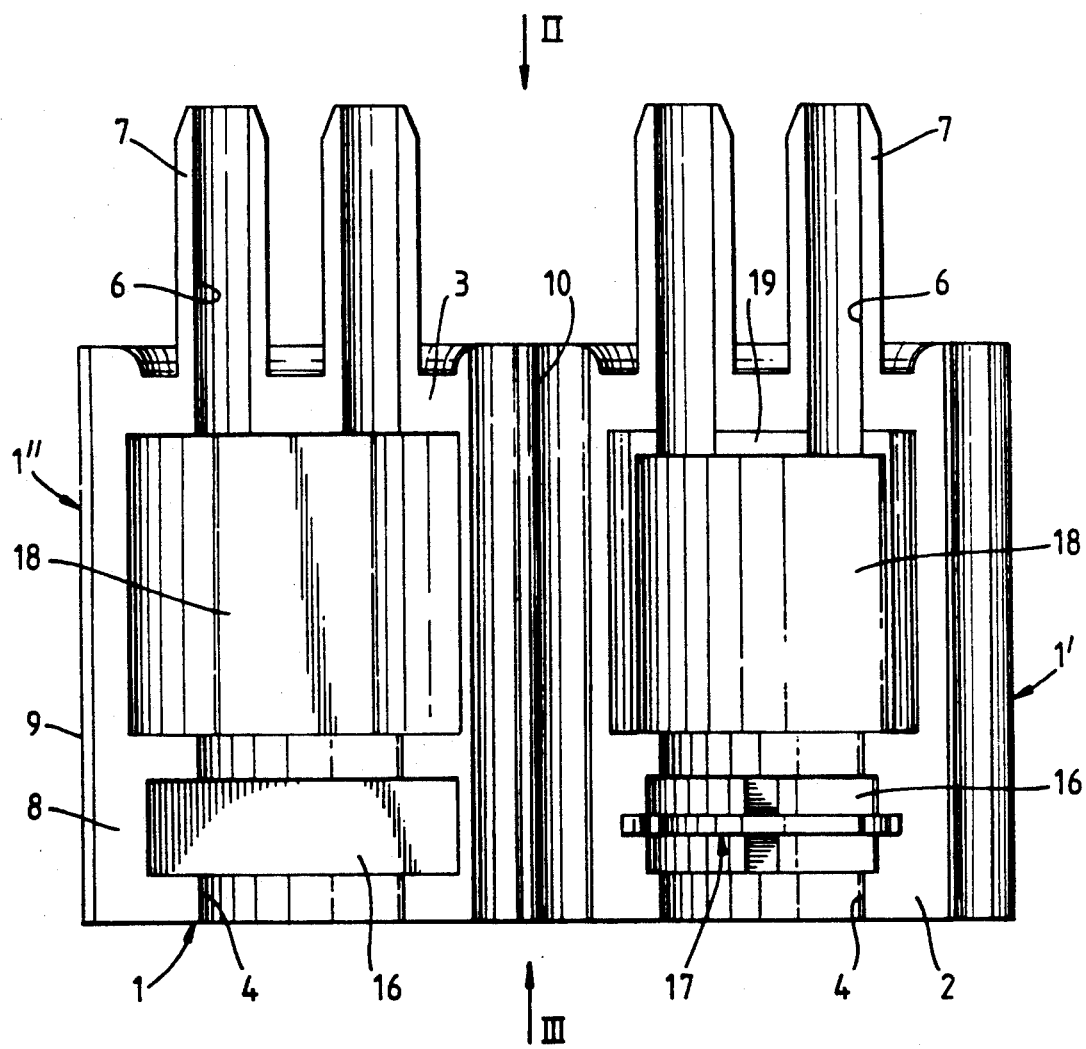
Figure 2:
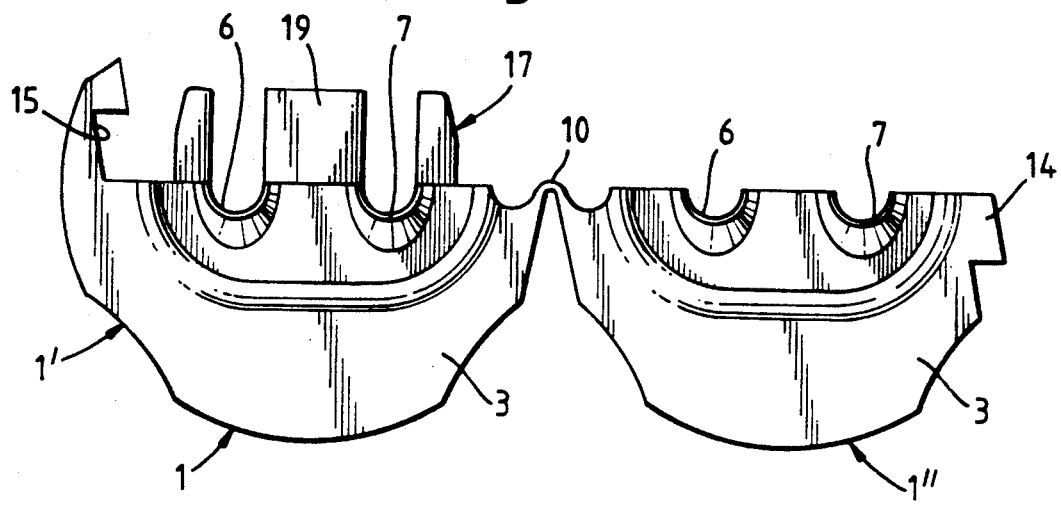
Figure 3:
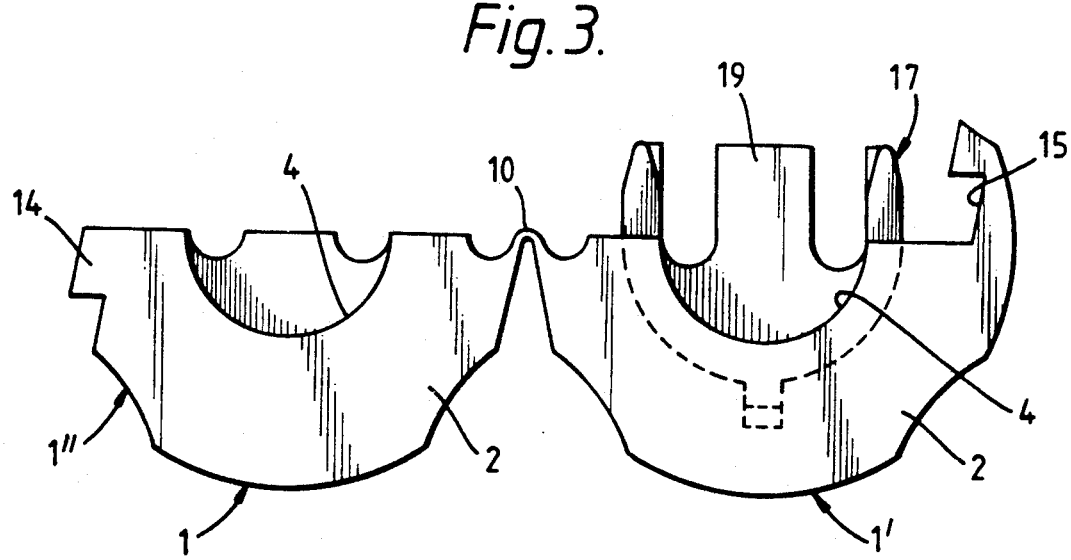

Referring to FIGS. 1 to 3, the mineral insulated cable terminating device to be used in the first preferred mineral insulated electric cable termination comprises a tube 1 of electrically insulating plastics material which at one end has an end wall 2 having a centrally disposed throughbore 4 of a diameter such that the tube will effect a tight fit over the cut-back sheath of a mineral insulated electric cable and which at the other end has an end wall 3 having two throughbores 6 for passage of conductors of the cable and, extending outwardly from the end wall 3, two sleeves 7 in axial alignment with the throughbores. At a first position 9 around the circumferential wall 8 of the tube 1, the wall is slit throughout its length and radial thickness so that the tube consists of two hinged parts 1', 1", and, at a second position substantially diametrically opposite the first position, the circumferential wall is of such a transverse cross-sectional shape and radial thickness that the wall at the second position effectively constitutes a hinge 10. The end wall 3 is slit diametrically from said first position 9 to the hinge 10 so that each of the two portions of the end wall is integral with one of the two hinged parts 1', 1" of the tube 1. The axis of each throughbore 6 in the end wall 3 lies on the diametrically extending slit in the end wall and each sleeve 7 is slit transversely throughout its length so that one part of the sleeve is integral with one portion of the end wall and the other part of the sleeve is integral with the other portion of the end wall.

One of the two abutting parts of the circumferential wall 8 of the tube 1 at the first position 9 has extending throughout its length an outwardly extending protruberence 14 which will effect a snap-fit in a groove 15 of complementary cross-sectional shape extending longitudinally throughout the length of the inner surface of the other part. The portion of the end wall 2 integral with each hinged part 1', 1" of the tube 1 has between its inner and outer end faces a recess 16 of substantially semi-circular shape and the circumferential wall of the hinged part 1'of the tube has in and protruding inwardly from the circumferential wall into the recess 16 a metal clip 17 of substantially C-shape, the limbs of the C-shaped clip being so spaced apart that, when the tube is fitted over the cut-back sheath of a cable, they will mechanically engage with and secure the tube to the cut-back sheath to restrain the tube against removal from the cable.

In each hinged part 1', 1" of the tube 1, the portions of the end walls 2, 3 and the circumferential wall 8 bound a well 18 and, in the hinged part 1' of the tube the well 18 is bounded on three sides by an upstanding wall 19 which, when the two hinged parts of the tube are closed together, will bear against the internal surface of the well of the hinged part 1". The well 18 of one of the hinged parts 1', 1" of the tube 1 may be pre-filled with waterproof electrically insulating compound of a grease-like nature (not shown).

Figure 4:
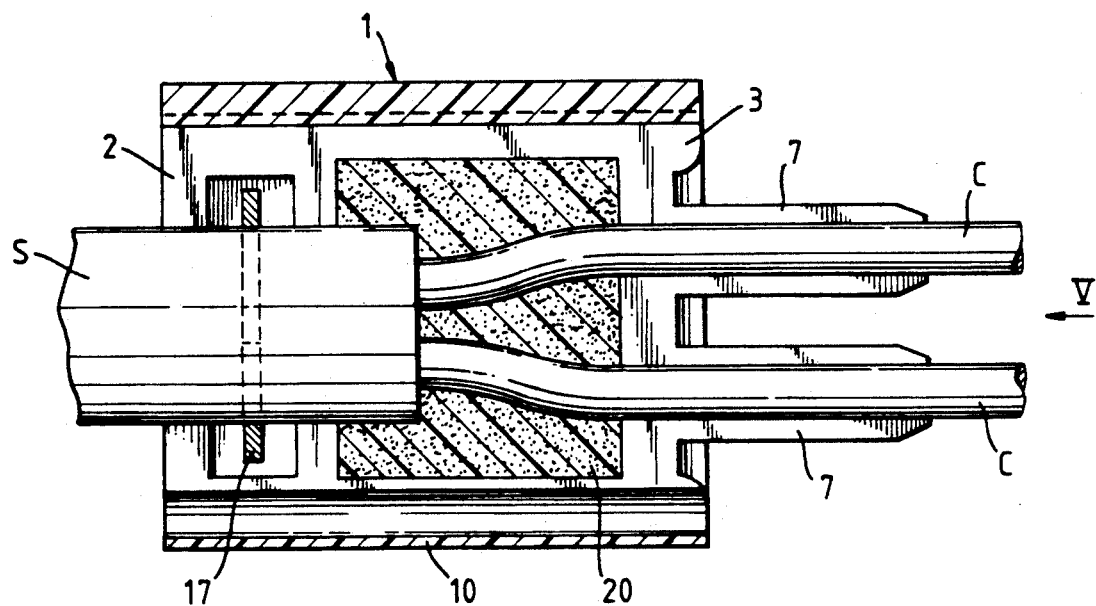
FIG. 4 is a sectional side view of the first preferred mineral insulated electric cable termination, drawn on a greatly enlarged scale.
Figure 5:
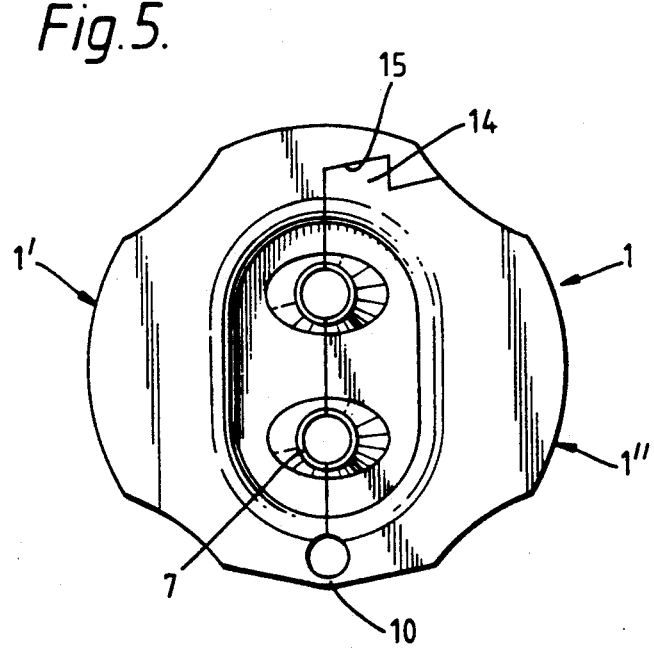
FIG. 5 is an end view of the termination shown in FIG. 4 in the direction of Arrow V.

When using the mineral insulated cable terminating device shown in FIGS. 1 to 3 to assembly the first preferred mineral insulated cable termination shown in FIGS. 4 and 5, if the well 18 of one of the hinged parts 1', 1" of the tube 1 has not been pre-filled with waterproof electrically insulating compound of a grease-like nature, such a compound 20 is introduced into the well 18 of one of the hinged parts and the hinged parts of the tube are so applied to the cut-back end of a mineral insulated cable that the cut-back sheath S of the cable is disposed between the portions of the end wall 2 and protrudes between the wells 18 and the conductors C of the cable are disposed in parts of the throughbores 6 in the end wall 3 and sleeves 7 of one hinged part of the tube. The hinged parts 1', 1" of the tube 1 are then closed so that the protruberence 14 effects a snap-fit in the groove 15 and the end wall 2 effects a tight fit on the cut-back sheath S of the cable, the limbs of the C-shaped clip 17 mechanically engaging with and securing the tube to the sheath so as to restrain the tube against removal from the cable. Excess insulating compound 20 is squeezed out of the tube 1 between each conductor C and the surrounding boundary wall of the throughbore 6 through which the conductor passes.

Referring to FIGS. 6 to 8, the mineral insulated cable terminating device to be used in the second preferred mineral insulated cable termination comprises a tube 21 of electrically insulating plastics material which at one end has an end wall 22 having a centrally disposed throughbore 24 of a diameter such that the tube will effect a tight fit over the cut-back sheath of a mineral insulated electric cable and which at the other end has an end wall 23 having three throughbores 26 for passage of conductors of the cable and, extending outwardly from the end wall 3, three sleeves 27 in axial alignment with the throughbores. At a first position 29 around the circumferential wall 28 of the tube 21, the wall is slit throughout its length and radial thickness so that the tube consists of two hinged parts 21', 21", and, at two circumferentially spaced positions around the circumferential wall, the circumferential wall is of such a transverse cross-sectional shape and radial thickness that the wall at these positions effectively constitutes hinges 30. The end wall 23 is slit transversely over a part 32 of its width extending from the first position 29 along its diameter and over the majority of the remainder of its width along two substantially parallel planes 33 on opposites sides of the axis of the end wall dividing the end wall into a central portion 23' and two other portions 23". The diametrically extending slit 32 contains the axis of one throughbore 26 and each of said two parallel slits 33 contains the axis of one of the other two throughbores. The end wall 22 is slit transversely over a part of its width extending from said first position along its diameter to the throughbore 24 and over the majority of the remainder of its width from said throughbore along said two parallel planes. Each sleeve 27 is slit transversely throughout its length so that one part of each of two of the sleeves is integral with the central portion 23' of the end wall 23 and the other part of said sleeve is integral with one of the other portions 23" of the end wall and so that each part of the third sleeve is integral with one of said other portions 23" of the end wall.

One of the two abutting parts of the circumferential wall 28 of the tube 21 at the first position 29 has extending throughout its length an outwardly extending protruberence 34 which will effect a snap fit in a groove 35 of complementary cross-sectional shape extending longitudinally throughout the length of the inner surface of the other part. The portion 22" of the end wall 22 integral with each hinged part 21', 21" of the tube 21 has between its inner and outer end faces a recess 36 of substantially arcuate shape and that part of the circumferential wall 28 integral with the central portion 22' of the end wall 22 has therein and protruding inwardly therefrom a metal clip 37 of substantially C-shape, the limbs of the C-shaped clip being so spaced apart that, when the tube is fitted over the cut-back sheath of a cable, they will mechanically engage with and secure the tube to the cut-back sheath to restrain the tube against removal of the cable.

In each hinged part 21',21" of the tube 21, the portions of the end walls 22, 23 and the circumferential wall 28 bound a well 38 and the well of one of the hinged parts of the tube may be pre-filled with waterproof electrically insulating compound of a grease-like nature (not shown).

Along a transversely extending line interconnecting the diametrically extending slit in the end wall 23 and the parallel slits therein the end wall has a step 25 intermediate of its inner and outer end surfaces so that parts of the portions 23" of the end wall will overlie a part of the central portion 23' of the end wall when the hinged parts 21',21" are closed together.

When using the mineral insulated cable terminating device shown in FIGS. 6 to 8 to assemble the second preferred mineral insulated cable termination shown in FIGS. 9 and 10, if the well 38 of one of the hinged parts 21', 21" of the tube 21 has not been pre-filled with waterproof electrically insulating compound of a greaselike nature, such a compound 40 is introduced into the well 38 of one of the hinged parts and the hinged parts of the tube are so applied to the cut-back end of a mineral insulated cable that the cut-back sheath of the cable is disposed between portions 22" of the end wall 22 and protrudes between the wells 38 and the conductors C of the cable are disposed in parts of the throughbores in the end wall 23 and sleeves 27 of the central portion 23' and one of the other portions 23" of the end wall. The hinged parts 21', 21" of the tube 21 are then closed so that the protruberence 34 effects a snap fit in the groove 35 and the end wall 22 effects a tight fit on the cut-back sheath S of the cable, the limbs of the C-shaped clip 37 mechanically engaging with and securing the tube to the sheath so as to restrain the tube against removal from the cable. Excess insulating compound 40 is squeezed out of the tube 21 between each conductor C and the surrounding boundary wall of the throughbore 26 through which the conductor passes.

Each of the mineral insulated electric cable terminations shown in FIGS. 4 and 5 and 9 and 10 is simple and inexpensive and can be readily assembled on an end of a mineral insulated electric cable by semi-skilled or unskilled personnel.

What I claim as my invention is:

1. A termination of a mineral insulated electric cable comprising at least one conductor insulated from a surrounding metal sheath, and, where there is more than one conductor, from the other conductor or conductors, by compacted mineral insulating powder, which termination comprises a tube of flexible electrically insulating material which at one end of the tube fits over the cut-back metal sheath of the cable and which at the other end of the tube is closed by an end wall spaced from the end face of the cable and having at least one throughbore, said at least one conductor passing through said at least one throughbore in the end wall and, filling the space within the tube between the end face of the cable and said end wall, waterproof electrically insulating compound which seals the compacted mineral insulating powder exposed at said end face of the cable, wherein at a first position around the circumferential wall of the tube the wall is slit throughout its length and radial thickness and at at least one position circumferentially spaced from said first position circumferentially spaced from said first position the wall is adapted to constitute a hinge extending throughout the length of the wall, the abutting longitudinally extending parts of the wall at said first position being so shaped that one effects a snap-fit with the other throughout the length of the tube.

2. A mineral insulated electric cable termination as claimed in claim 1, wherein one of said two abutting parts of the circumferential wall of the tube at said first position has extending longitudinally throughout its length an outwardly extending protuberance which effects a snap-fit in a groove of complimentary cross-sectional shape extending longitudinally throughout the length of the inner surface of the other part.

3. A mineral insulated electric cable termination as claimed in claim 1, wherein the circumferential wall of the tube at said at least one position circumferentially spaced from said first position is of such a transverse cross-sectional shape and radial thickness that the wall at this position effectively constitutes a hinge.

4. A mineral insulated electric cable termination as claimed in claim 1, in which the mineral insulated electric cable has two conductors, wherein the circumferential wall of the tube is adapted to constitute a hinge extending throughout the length of the wall at a second position substantially diametrically opposite said first position and wherein the end wall of the tube is slit substantially diametrically from said first position to said second position so that the end wall is divided into two parts and that each part of the end wall is integral with one of the two hinged parts of the tube.

5. A mineral insulated electric cable termination as claimed in claim 1, wherein the end wall of the tube has extending lengthwise and outwardly from the end wall at least one sleeve in substantially axial alignment with said at least one throughbore in the end wall and surrounding said at least one conductor.

6. A mineral insulated electric cable termination as claimed in claim 4, wherein the end wall of the tube has extending outwardly from the end wall two sleeves in substantially axial alignment with the throughbores in the end wall and surrounding the conductors, the axis of each throughbore lying on said diametrically extending slit and each sleeve being slit transversely throughout its length so that one part of the sleeve is integral with one portion of the end wall and the other part of the sleeve is integral with the other portion of the end wall.

7. A mineral insulated electric cable termination as claimed in claim 1, wherein the circumferential wall of the part of the length of the tube which fits over the cut-back metal sheath of the cable has in and protruding inwardly from the circumferential wall a device of metal or metal alloy whose protruding part so mechanically engages with and secures the tube to the metal sheath as to restrain the tube against removal from the cable.

8. A mineral insulated electric metal termination as claimed in claim 7, wherein the metal retaining device is a clip which has a protruding part of substantially C-shape between the limbs of which the cable sheath is a force-fit.

9. A termination of a mineral insulated electric cable comprising three conductors each insulated from the other conductors and from a surrounding metal sheath by compacted mineral insulating powder, which termination comprises a tube of flexible electrically insulating material which at one end of the tube fits over the cut-back metal sheath of the cable and which at the other end of the tube is closed by an end wall spaced from the end face of the cable and having three throughbores, each conductor passing through one of said throughbores in the end wall and, filling the space within the tube between the end face of the cable and said end wall, waterproof electrically insulating compound which seals the compacted mineral insulating powder exposed at said end face of the cable, wherein the end wall of the tube is slit transversely throughout its radial thickness and over a part of its width along its diameter extending from a first position around the circumferential wall of the tube and over the majority of the remainder of its width along two substantially parallel planes on opposite sides of the axis of the end wall dividing the end wall into a central portion and two other portions, the diametrically extending slit containing the axis of one throughbore and each of said two parallel slits containing the axis of one of the other two throughbores and wherein the circumferential wall of the tube at two circumferentially spaced positions extending from the closed ends of the two parallel slits in the end wall and throughout the length of the circumferential wall is adapted to constitute two circumferentially spaced hinges.

10. A mineral insulated electric cable termination as claimed in claim 9, wherein the end wall of the tube has extending outwardly from the end wall three sleeves in substantially axial alignment with the throughbores in the end wall and surrounding the cable conductors, each of the sleeves being slit transversely throughout its length so that one part of each of two of the sleeves is integral with the central portion of the end wall and the other part of said sleeve is integral with one of the other portions of the end wall and so that each part of the third sleeve is integral with one of said other portions of the end wall.

11. For use in the assembly of a termination of a mineral insulated electric cable comprising at least one conductor insulated from a surrounding metal sheath, and, where there is more than one conductor, from the other conductor or conductors, by compacted mineral insulating powder, a mineral insulated cable terminating device comprising a tube of flexible electrically insulating material which is of substantially circular internal and external transverse cross-section and which is open at one end and closed at its other end by an end wall extending substantially radially with respect to the longitudinal axis of the tube and having therein at least one throughbore, wherein at a first position around the circumferential wall of the tube the wall is slit throughout its length and radial thickness and at a least one position circumferentially spaced from said first position the wall is adapted to constitute a hinge extending throughout the length of the wall, the longitudinally extending parts of the wall at said first position being so shaped that one is adapted to effect a snap-fit with the other throughout the length of the tube.

12. A mineral insulated electric cable terminating device as claimed in claim 11, wherein the circumferential wall of the tube is adapted to constitute a hinge extending throughout the length of the wall at a second position substantially diametrically opposite said first position and the end wall is slit substantially diametrically from said first position to said second position so that each part of the end wall is integral with one of the two parts of the tube.

13. A mineral insulated electric cable terminating device as claimed in claim 11, wherein the end wall of the tube is slit transversely over a part of its width extending from said first position along its diameter and over the majority of the remainder of its width along two substantially parallel planes on opposite sides of the axis of the end wall dividing the end wall into a central portion and two other portions, the diametrically extending slit containing the axis of one of two other throughbores and wherein the circumferentially spaced positions extending from the closed ends of the two parallel slits in the end wall and throughout the length of the circumferential wall is adapted to constitute two circumferentially spaced hinges.

14. A mineral insulated cable terminating device as claimed in claim 11, wherein at least one of the parts of the tube is pre-filled with waterproof electrically insulating compound of a grease-like nature.

15. A mineral insulated cable terminating device as claimed in claim 11, wherein one of said longitudinally extending parts of the wall at said first position has extending longitudinally throughout its length an outwardly extending protruberence and the other of said longitudinally extending parts has extending longitudinally throughout the length of its inner surface a groove of complementary cross-sectional shape in which said protruberence will effect a snap-fit.

* * * * *